(12) United States Patent
Yang et al.

(10) Patent No.: US 10,815,627 B2
(45) Date of Patent: Oct. 27, 2020

(54) METHOD FOR IMPROVING SEISMIC PERFORMANCE OF BRIDGE BY USING BEAM BODY AND ENERGY DISSIPATION AND SEISMIC MITIGATION BRIDGE BEARING

(71) Applicant: CHINA RAILWAY ERYUAN ENGINEERING GROUP CO.,LTD, Chengdu (CN)

(72) Inventors: Jizhong Yang, Chengdu (CN); Lie Chen, Chengdu (CN); Kejian Chen, Chengdu (CN); Yingliang Wang, Chengdu (CN); Yinguang Xu, Chengdu (CN); Wanming Zhai, Chengdu (CN); Yongxing Wei, Chengdu (CN); Mingjun Liu, Chengdu (CN); Chengbiao Cai, Chengdu (CN); Yongping Zeng, Chengdu (CN); Xiaolong Zhen, Chengdu (CN); Ming Yuan, Chengdu (CN); Lihui You, Chengdu (CN); Dubei Feng, Chengdu (CN); Zhigang Yuan, Chengdu (CN)

(73) Assignee: CHINA RAILWAY ERYUAN ENGINEERING GROUP CO., LTD., Chengdu (CN)

( * ) Notice: Subject to any disclaimer, the term of this patent is extended or adjusted under 35 U.S.C. 154(b) by 103 days.

(21) Appl. No.: 16/327,828

(22) PCT Filed: Aug. 23, 2017

(86) PCT No.: PCT/CN2017/098657
§ 371 (c)(1),
(2) Date: Feb. 24, 2019

(87) PCT Pub. No.: WO2018/036519
PCT Pub. Date: Mar. 1, 2018

(65) Prior Publication Data
US 2019/0194883 A1    Jun. 27, 2019

(30) Foreign Application Priority Data

Aug. 24, 2016  (CN) ........................... 2016 1 0719699
Feb. 15, 2017  (CN) ........................... 2017 1 0080235

(51) Int. Cl.
*E01D 19/04*    (2006.01)
*E04H 9/02*    (2006.01)
(Continued)

(52) U.S. Cl.
CPC ............. *E01D 19/041* (2013.01); *E01D 1/00* (2013.01); *E01D 19/02* (2013.01); *E01D 19/04* (2013.01);
(Continued)

(58) Field of Classification Search
CPC ........... E01D 1/00; E01D 19/02; E01D 19/04; E01D 19/041; E04H 9/02; E04H 9/021; F16F 15/04
(Continued)

(56) References Cited

U.S. PATENT DOCUMENTS 4,499,694 A * 2/1985 Buckle ...................... E04B 1/98
52/167.7
4,527,365 A * 7/1985 Yoshizawa ................ F16F 7/08
267/154
(Continued)

FOREIGN PATENT DOCUMENTS

CN    204185763 U    3/2015
CN    106120545 A   11/2016
(Continued)

OTHER PUBLICATIONS

Lin Shang, Modal Mass Computation Based on ANSYS Finite Element Analysis, Missiles and Space Vehicles, 2011, 313(3): 55-57.
Xufang Wang, Application Technology and Design Requirement of High Speed Railway Bridge Bearing, High Speed Railway Technology, Oct. 2011, No. 5, vol. 2, pp. 51-54.

*Primary Examiner* — Raymond W Addie
(74) *Attorney, Agent, or Firm* — Bayramoglu Law Offices LLC (57) ABSTRACT

A method for improving the seismic performance of bridges by utilizing the beam body and an energy dissipation and
(Continued)

seismic mitigation bridge bearing, which can effectively eliminate the harmful vibration of the bridge pier in the inherent frequency band, thus reducing the stress of the pier body and improving the seismic performance of the bridge pier without introducing external additional mass and looking for an installation space on the pier. The method includes the following steps: obtain the natural frequency fi, the equivalent modal mass Mi and the modal stiffness Ki of the pier in the longitudinal or transverse direction by numerical modal analysis or experimental modal test; determine the mass mi of the beam body; calculate the connection stiffness ki and the connection damping ci between the beam body and the pier; select the bearing system with above connection stiffness ki and the connection damping ci.

9 Claims, 4 Drawing Sheets

(51) Int. Cl.
*E01D 1/00* (2006.01)
*E01D 19/02* (2006.01)
*F16F 15/04* (2006.01)

(52) U.S. Cl.
CPC .............. *E04H 9/02* (2013.01); *E04H 9/021* (2013.01); *F16F 15/04* (2013.01)

(58) Field of Classification Search
USPC ................................. 14/73.5; 52/167.1–167.9
See application file for complete search history.

(56) References Cited

U.S. PATENT DOCUMENTS

| | | | | |
|---|---|---|---|---|
| 4,938,633 A * | 7/1990 | Wu | .......................... | E02D 27/34 |
| | | | | 376/285 |
| 5,014,474 A * | 5/1991 | Fyfe | ....................... | E02D 31/08 |
| | | | | 14/73.5 |
| 5,324,117 A * | 6/1994 | Matsushita | ............. | E04H 9/022 |
| | | | | 14/73.5 |
| 5,349,712 A * | 9/1994 | Kawashima | .............. | E04H 9/02 |
| | | | | 14/73.5 |
| 5,456,047 A * | 10/1995 | Dorka | ..................... | E04H 9/021 |
| | | | | 248/568 |
| 5,713,162 A * | 2/1998 | Gallo | ....................... | E01D 19/02 |
| | | | | 52/167.1 |
| 6,249,925 B1 * | 6/2001 | Ishida | ..................... | E04H 9/021 |
| | | | | 14/73.5 |
| 6,499,170 B2 * | 12/2002 | Kim | ........................ | E01D 19/02 |
| | | | | 14/73.5 |
| 2015/0361656 A1 * | 12/2015 | Miyazaki | ............... | B22D 19/16 |
| | | | | 52/167.8 |
| 2016/0122498 A1 * | 5/2016 | Wake | ...................... | C08L 93/04 |
| | | | | 52/167.1 |
| 2019/0145066 A1 * | 5/2019 | Kochiyama | ............. | F16F 15/04 |
| | | | | 52/167.7 |

FOREIGN PATENT DOCUMENTS

| | | |
|---|---|---|
| CN | 106638288 A | 5/2017 |
| JP | 2016023445 A | 2/2016 |

* cited by examiner

METHOD FOR IMPROVING SEISMIC PERFORMANCE OF BRIDGE BY USING BEAM BODY AND ENERGY DISSIPATION AND SEISMIC MITIGATION BRIDGE BEARING

CROSS REFERENCE TO THE RELATED APPLICATIONS

This application is the national phase entry of International Application No. PCT/CN2017/098657, filed on Aug. 23, 2017, which is based upon and claims priority to Chinese Patent Application No. 201610719699.6, filed on Aug. 24, 2016, and Chinese Patent Application No. 201710080235.X, filed on Feb. 15, 2017, the entire contents of which are incorporated herein by reference.

TECHNICAL FIELD

The invention relates to a bridge seismic resistance technique, more specifically, to a method for improving the seismic performance of a bridge by using the beam body and an energy dissipation and seismic mitigation bridge bearing, which is a bridge seismic resistance technique suitable for high-pier bridges in particular.

BACKGROUND

Bridge seismic resistance technique has always been the key focus of professional designers at home and abroad. Especially for the seismic design of long-span bridges with high piers, there are no relevant standards and specifications. At present, there are two common methods for improving the seismic performance of bridges. One is to increase the strength and deformation capacity of the pier structure to improve its seismic performance, that is, rely on the plastic deformation of the pier itself to dissipate seismic energy, e.g. the installation of plastic hinges at the bottom of the pier. Another common method is to use seismic mitigation and isolation bearings, which can dissipate seismic energy through shear deformation or dry friction on the one hand, and, through the reduction of stiffness, prolong the vibration period of the structure on the other hand. Thus it has been widely used in bridge engineering.

Southwest and northwest mountainous areas of China are featured by complicated landform with staggered gullies, and most of the gullies are located in high intensity earthquake areas. Thus high-pier bridges with lighter superstructure and larger span are usually adopted when crossing these trenches and canyons. There are two difficulties in seismic design of the high-pier bridges: one is the ductility design of high piers due to unpredictable positions of various plastic hinge areas that may be formed on the pier (such as at the bottom and middle of the pier at the same time) under earthquake action, as high mode has great influence on the seismic response of high piers. Meanwhile, under severe earthquake action, once the pier is destroyed or damaged, it is extremely difficult to repair, and the repair cost is high. The other one is that because of the medium-long-term soft structure and strict requirements for deformation capability of the high-pier bridge, it is not suitable to adopt the most widely used seismic mitigation and isolation bearing at present that dissipates seismic energy by prolonging the vibration period of the structure. At the same time, the seismic mitigation and isolation bearing have obvious seismic mitigation effect in the vertical direction but weak deformation resistance in the horizontal plane. Therefore, the application of the seismic mitigation and isolation bearing in the seismic design of high-pier bridges is more cautious.

The main seismic frequency transmitted to the bridge construction site is about 0.5 Hz-10 Hz, and most of the bridge modes will be excited. If the main vibration modes of the pier can be restrained or limited, the vibration displacement and stress of the pier will be weakened. Dynamic vibration absorber is a device to suppress structural resonance, which was proposed by Ormondroyd and Den Hartog in 1928. It has been widely used in mechanical and civil structures, and also widely used in the vibration control of the bridge cable and the beam body. In recent years, some scholars (such as Professor Chen Xingchong of Lanzhou Jiaotong University, Dr, Yu Qianhua of Tongji University, etc.) put forward the application of dynamic vibration absorber to suppress the vibration of the pier under the action of earthquake. For example, Chinese Patent Application No. 201420319835.9 discloses a passive dynamic vibration absorber pier, which utilizes the principle of dynamic vibration absorber to install additional mass blocks in railway hollow high-pier bridges to dissipate energy through the displacement of the mass blocks. As is known to all, the main factor that affects the vibration attenuation effect of dynamic vibration absorber is the mass ratio between the additional mass blocks and the structure. The larger the mass ratio is, the better the vibration attenuation effect will be. However, due to the limitation of the pier installation space, the mass of the additional mass blocks is smaller than that of the pier, so the seismic effect cannot be improved. In this way, an external mass block must be added to the pier, which usually has a mass of tens or hundreds of tons, so the installation and construction of it is very difficult.

SUMMARY

The technical problem to be solved by the invention is to provide a method for improving the seismic performance of bridges by utilizing the beam body, which can effectively eliminate the harmful vibration of the bridge pier in the inherent frequency band, thus reducing the stress of the pier and improving the seismic performance of the bridge pier without introducing external additional mass and looking for an installation space on the pier.

The technical proposal adopted by e invention for solving above technical problem is as follows:

A method of the invention for improving seismic performance of bridges by utilizing the beam body, including the beam body, the pier and the beating system arranged between the top of the pier and the longitudinal ends of the beam body. The method comprises the following steps:

a. Obtain the natural vibration frequency $f_i$ of the pier, the equivalent modal mass $M_i$ and modal stiffness $K_i$ in longitudinal or transverse direction through numerical modal analysis or experimental modal test;

b. Determine the beam body mass $m_i$;

c. Calculate the connection stiffness $k_i$ between the beam body and the pier with the following formula:

$$k_i = \frac{1}{\left(1+\frac{m_i}{M_i}\right)^2} \frac{K_i}{M_i} m_i;$$

d. Calculate the connection damping $c_i$ between the beam body and the pier with the following formula:

$$c_i = 2m_i \sqrt{\frac{K_i}{M_i}} \sqrt{\frac{3\frac{m_i}{M_i}}{8\left(1+\frac{m_i}{M_i}\right)^3}};$$

e. Select the bearing system with above connection stiffness $k_i$ and the connection damping $c_i$ to improve the seismic performance of the pier with the beam body as the dynamic vibration absorber.

Another technical problem to be solved by the invention is to provide an energy dissipation and seismic mitigation bridge bearing using the above method for improving the seismic performance of bridges by using the beam body. The bearing system includes the upper bearing plate, lower bearing plate and vertical bearing structure located between the two. The upper and lower bearing plates are respectively permanently connected with the beam body and the pier cushion. The characteristics of the bearing system are that the outer edges of the upper and the lower bearing plates are respectively provided with the vertically extending upper and lower baffle structure, and elastic connectors are arranged on the horizontal plane between the upper and lower baffles with the distal end and the proximal end of the elastic connectors fixedly connected with the upper and lower baffles. And the horizontal connection stiffness $k_i$ and the connection damping $c_i$ between the beam body and the pier meet the requirements of the above formula.

The beneficial effects of the invention are that, by reasonably setting the elastic connection stiffness and damping the between the beam body and the pier in the horizontal plane, the beam body and the bearing form a dynamic vibration absorber attached to the top of the pier to achieve the vibration phase of the beam body that is opposite to the vibration phase of the pier structure in the natural frequency band of the pier structure. In this way, the harmful vibration of the pier structure in the frequency band can be effectively eliminated to reduce the displacement of the pier top, and the bending moment and the stress of the pier, thus the overall seismic performance of the bridge can be effectively improved.

At the same time, the elastic connectors of the energy dissipation and seismic mitigation bearing system can be conveniently arranged according to the specific conditions and needs, so that the vibration in the transverse direction of bridge or along the bridge direction, the vibration in the transverse direction of bridge and along the bridge direction and the vibration in the whole horizontal plane can be eliminated. The longitudinal bearing structure may follow the main part of the existing rubber bearing, lead core rubber bearing, friction pendulum bearing, the shaped steel bearing and other bearings with only the upper and lower bearing plates changed to provide it with the baffle structure for installing additional elastic connectors. It is of simple structure, easy implementation and significant effects. Combining with the existing plastic hinges, seismic mitigation and isolation bearings and additional dynamic vibration absorbers, it can become an important means to improve the seismic performance of high-pier bridges in the future.

BRIEF DESCRIPTION OF THE DRAWINGS

This specification includes ten drawings as below.

Names of components and corresponding marks shown in FIGS. 1-4: beam body 10, bearing system 20, vertical bearing structure 20a, spring and damping vibration absorber 20b, pier 30, transverse movable beating 110, fixed bearing 120, multi-directional movable bearing 130, longitudinal movable bearing 140.

Names of components and corresponding marks shown in FIGS. 5-10: beam body 10; vertical bearing structure 20a, upper bearing plate 21, upper baffle 211, lower bearing plate 22, lower baffle 221; pier cushion 31; elastic connector 40.

DETAILED DESCRIPTION OF THE EMBODIMENTS

Further description of the invention will be made below in combination with the drawings. It is necessary to point out that the following examples are only used to further explain the invention and are not to be construed as limitations of the scope of protection of the invention, and that some non-essential modifications and adjustments made by those skilled in the field to the invention in accordance with the foregoing contents of the invention and the specific implementation thereof shall remain within the scope of protection of the invention.

Figure 1:
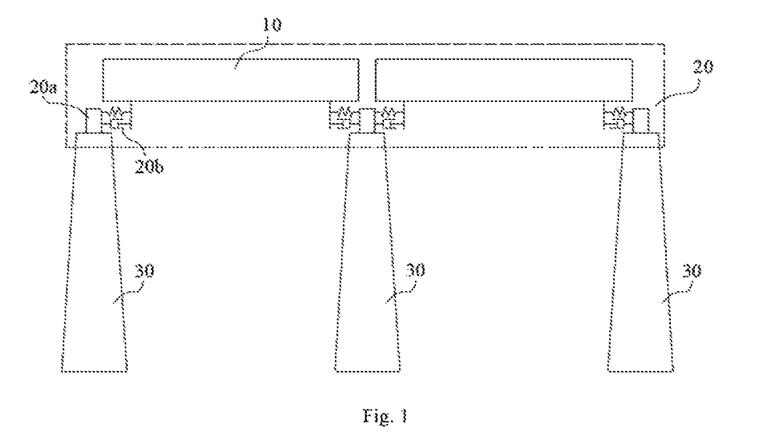
FIG. 1 is the schematic diagram of a method of the invention for improving seismic performance of bridges using the beam body.

Referring to FIG. 1, the invention is a method for improving seismic performance of bridging using the beam body including the beam body 10, pier 30, and bearing system 20 arranged between the top of the pier 30 and the longitudinal end of the beam body 10. With the large mass attribute, the beam body 10 is used as the dynamic vibration absorber additional mass for improving the seismic performance of the pier 30. By reasonably setting the longitudinal and transverse connection stiffness and damping between the beam bodies and piers, dynamic vibration absorbers attached to the pier 30 are formed. And under the action of earthquake and wind load, the vibration phase of the beam body 10 is opposite to the vibration phase of the pier 30 in the natural frequency band of the pier 30, and it can effectively eliminate the harmful vibration of the pier 30 in the frequency band, thus achieving the purpose of reducing the stress of the pier and improving the seismic performance of the pier.

The invention is a method for improving the seismic performance of bridges by utilizing a beam body, comprising the following steps:

a. Obtain the natural frequency $f_i$, the equivalent modal mass $M_i$ and the modal stiffness $K_i$ of the pier 30 in the longitudinal or transverse direction by numerical modal analysis or experimental modal test;

b. Determine the mass $m_i$ of the beam body 10;

c. Calculate the connection stiffness $k_i$ between the beam body 10 and the pier 30 with the following formula:

$$k_i = \frac{1}{\left(1+\frac{m_i}{M_i}\right)^2} \frac{K_i}{M_i} m_i;$$

d. Calculate the connection damping $c_i$ between the beam body 10 and the pier 30 with the following formula:

$$c_i = 2m_i \sqrt{\frac{K_i}{M_i}} \sqrt{\frac{3\frac{m_i}{M_i}}{8\left(1+\frac{m_i}{M_i}\right)^3}};$$

e. Select the bearing system 20 with the above values of the connection stiffness $k_i$ and the connection damping so that the pier seismic performance can be improved by using the beam body as a dynamic vibration absorber.

In step a above, for the pier not yet under construction, firstly, build the finite element model of the pier, and conduct the modal analysis to obtain the natural frequency $f_i$ and corresponding mode in the longitudinal or transverse direction of the pier. Then obtain the corresponding vibration mass of different modes (i.e. equivalent modal mass $M_i$) using the equivalent mass method (see literature: Modal Mass Calculation Method based on ANSYS Finite Element Analysis by Shang Lin, Missiles and Space Vehicles, 2011, 313 (3): 55-57). For the completed piers, the natural frequency $f_i$, corresponding mode and equivalent mode mass $M_i$ can also be obtained by means of experimental modal test.

Calculate modal stiffness $K_i$ as following formula:

$$K_i = M_i(2\pi f_i)^2$$

Referring to FIG. 1, the bearing system 20 may also be constituted by the vertical bearing structure 20a, spring and damping vibration absorber 20b, where the vertical bearing structure 20a is fixed at the top of the pier 30, and the spring and damping vibration absorber 20b are connected to the vertical bearing structure 20a and the beam body 10 at both ends respectively.

Taking the 32.6 m long simply-supported beam of a 50 m high pier as an example, the pier adopts a round-end hollow pier, and the external dimension of the round-end section dimension at the pier top is 10.6 m×5.4 m. The length from the pier top to the pier bottom increases linearly, and the gradient is 1:40. The beam structure is a double-track four-piece simply-supported T-beam.

Figure 2:
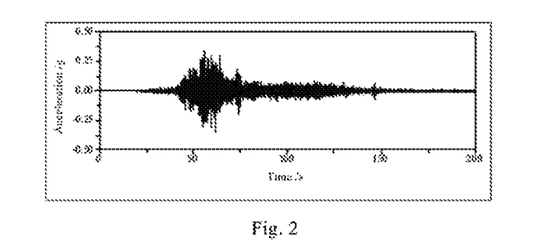
FIG. 2 is the time-domain chart of a typical Wenchuan earthquake wave.
Figure 3:
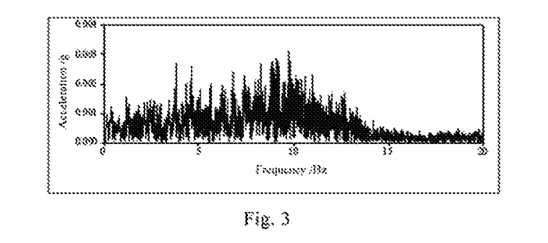
FIG. 3 is the frequency-domain chart of a typical Wenchuan earthquake wave.

The lateral seismic performance of the bridge under the action of a typical Wenchuan earthquake wave as shown in FIGS. 2 and 3 is analyzed comparatively.

Figure 4:
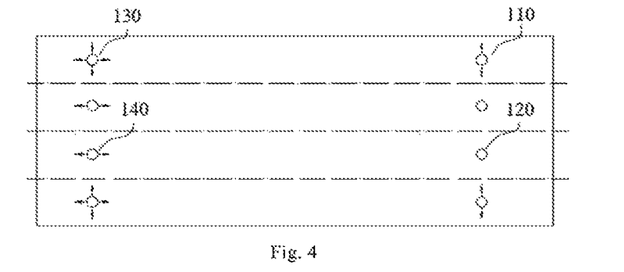
FIG. 4 is the schematic diagram of a general bearing arrangement method.

Measure 1: Common bridge bearing. The installation schematic diagram of the bearing is shown in FIG. 4. The longitudinal and transverse rigidity of the movable bearing is $5 \times 10^6$ N/m, and the damping is $1 \times 10^4$ N·s/m.

Measure 2: Common bearing (same as measure 1)+additional external dynamic vibration absorber on pier top (i.e. method described in patent 201420319835.9). According to the estimated installation space at the pier top, the available installation space of the tuned mass damper (TMD) at the pier top is about 10.92 m³, and the maximum mass ratio for the first-order transverse vibration mode is 0.04 for the cast iron with higher density (7850 kg/m3). The corresponding stiffness of the dynamic vibration absorber is $1.9 \times 10^7$ N/m, and the damping is $3.04 \times 10^5$ N·s/m.

Measure 3: The method described in the invention of using the beam body as a dynamic vibration absorber with a beam body mass of 994.9 t, a maximum mass ratio $\mu$ of 0.662 for the first-order transverse mode, a connection rigidity between the corresponding beam body and the pier of $7.34 \times 10^7$ N/m, and a damping of $4.67 \times 10^6$ N·s/m.

See Table 1 for the maximum value of the dynamic response of a 50 m high-pier bridge using the above three seismic measures.

TABLE 1

Maximum Value of Bridge Dynamic Response

| | Measure 1 | Measure 2 | Measure 3 |
|---|---|---|---|
| Beam body midspan displacement/mm | 35.5 | 20.7 | 20.1 |
| Beam body midspan acceleration/m/s² | 12.7 | 8.91 | 5.29 |
| Pier top displacement/mm | 32.0 | 17.8 | 12.3 |
| Pier top acceleration/m/s² | 9.96 | 7.04 | 6.90 |
| Pier bottom stress/MPa | 3.15 | 1.93 | 1.02 |

According to the *Code for Design on Reinforced and Prestressed Concrete Structure of Railway Bridge and Culvert* (TB10002.3-2005), the ultimate tensile strength of common C20 concrete for piers is 1.70 MPa, and even for C30 concrete, the ultimate tensile strength is 2.20 MPa. The maximum stress value at the bottom of the pier in measure 1 is 3.15 MPa, which is much higher than the ultimate tensile strength of C30 concrete. Under the action of this seismic wave, the pier bottom is prone to crack and be damaged. The maximum stress value at the bottom of the pier in measure 2 is 1.93 MPa, which has already exceeded the ultimate tensile strength of C20 concrete. Measure 3 adopts the beam body as the dynamic vibration absorber to store and dissipate seismic energy, and the maximum stress value at the bottom of the pier is 1.02 MPa, which is far lower than the ultimate tensile strength of C20 concrete. At the same time, the vibration displacement and vibration acceleration of the beam body, and the displacement and vibration acceleration of the top of the pier are all reduced to a great extent, which effectively improves the seismic performance of the bridge.

Figure 5:
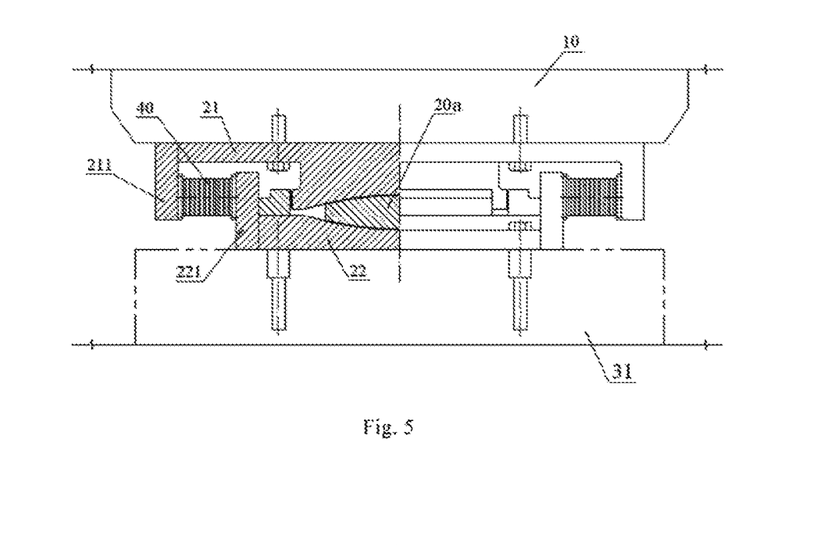
FIG. 5 is the schematic diagram of the energy dissipation and seismic mitigation bridge bearing of the invention.
Figure 6:
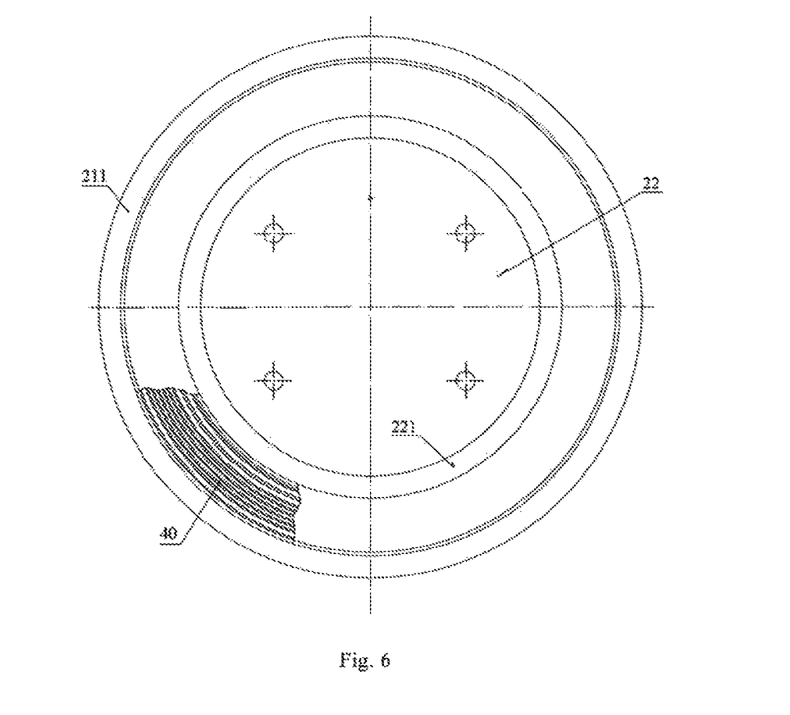
FIG. 6 is the upward view of example 1 of the energy dissipation and seismic mitigation bridge bearing of the invention.
Figure 7:
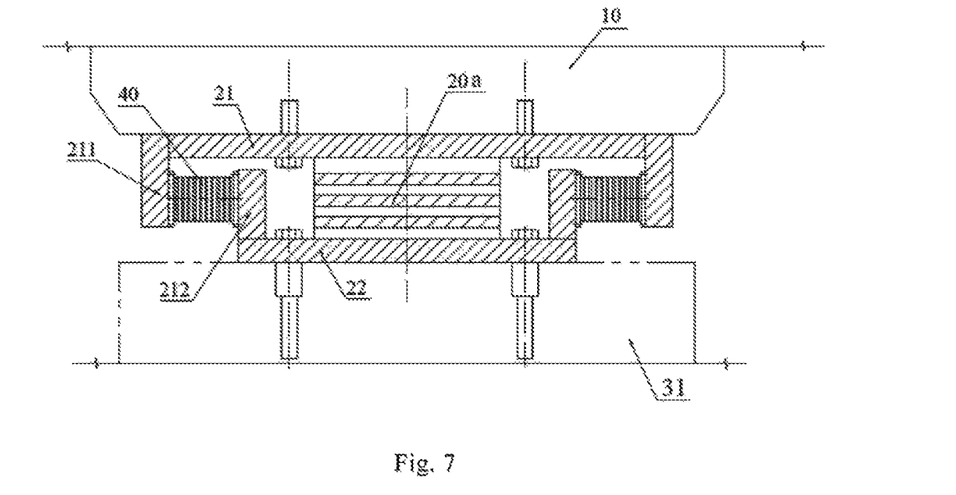
FIG. 7 is the schematic diagram of the energy dissipation and seismic mitigation bridge bearing of the invention.

Referring to FIG. 5, the bearing system 20 of the energy dissipation and seismic mitigation bridge bearing of the invention includes an upper bearing plate 21, a lower bearing plate 22 and a vertical bearing structure 20a arranged between the upper bearing plate 21 and the lower bearing plate 22 that are fixedly connected to the beam body 10 and the pier cushion 31 respectively. The outer edges of the upper bearing plate 21 and the lower bearing plate 22 are respectively provided with vertically extending upper baffle 211 and lower baffle 221 structure, and elastic connectors 40 are arranged on the horizontal plane between the upper baffle 211 and lower bearing plate 221 with the distal end and the proximal end of the elastic connectors fixedly connected with the upper baffle 211 and lower baffle 221. The elastic connector 40 is made of a rubber material or a high elastic damping material.

The connection stiffness $k_i$ and the connection damping $c_i$ between the beam body 10 and the pier are:

$$k_i = \frac{1}{\left(1+\frac{m_i}{M_i}\right)^2} \frac{K_i}{M_i} m_i$$

$$c_i = 2m_i \sqrt{\frac{K_i}{M_i}} \sqrt{\frac{3\frac{m_i}{M_i}}{8\left(1+\frac{m_i}{M_i}\right)^3}}$$

Where $M_i$ is the equivalent modal mass, $m_i$ is the mass of the beam body 10, $K_i$ is the modal stiffness, $K_i=M_i(2\pi f_i)^2$, and $f_i$ is the natural frequency of the pier.

As the elastic connector 40 has the optimal connection stiffness and connection damping value, the beam body and the bearing form a dynamic vibration absorber attached to the pier top, which can effectively dissipate seismic energy to reduce the displacement of the high pier top, and the bending moment and the stress of the pier body, thus effectively improving the overall seismic performance of the bridge.

Referring to FIGS. 1 and 3, the longitudinal bearing structure 20a may follow the main part of the existing rubber bearing, lead core rubber bearing, friction pendulum bearing, the shaped steel bearing and other bearings with only the upper bearing plate 21 and lower bearing plate 22 changed, thereby effectively reducing the production cost of the bridge anti-seismic bearing.

Compared with the traditional seismic mitigation and isolation bearing, the invention has an optimum value of connection stiffness and connection damping in the horizontal plane between the beam body and the pier. The optimum value of the longitudinal stiffness and damping is related to the longitudinal vibration mass of the bridge beam body and the longitudinal natural frequency of the pier. The optimum value of the transverse stiffness and damping is related to the transverse vibration mass of the bridge beam body and the transverse natural frequency of the pier. If the value is too large or too small, the anti-seismic effect will be affected. According to the design principle of seismic mitigation and isolation bearings, the greater the damping in horizontal direction is, the greater the seismic dissipation effect is; the smaller the stiffness in horizontal direction is, the higher the seismic isolation performance is. However, too small stiffness of horizontal bearing will cause large displacement of beam body and pier top, which will threaten the traffic safety, which is not allowed. Therefore, there is no optimum value of stiffness and damping in the horizontal plane of the seismic mitigation and isolation bearing.

In the realization form, the invention can combine the optimal connection stiffness and connection damping between the beam body and the pier body with the existing bearings, that is, the requirements for the longitudinal and transverse connection stiffness and the connection damping of the supports are put forward so as to meet the requirements of the optimal value. In principle, the invention is essentially different from the seismic mitigation and isolation bearing, the seismic mitigation and isolation bearing is based on the principle of low rigidity vibration isolation and high damping vibration absorption to improve the seismic performance of bridges. The invention utilizes the principle of dynamic vibration absorption to improve the seismic performance of the bridge pier, that is, by reasonably setting the connection stiffness and connection damping in the transverse and longitudinal direction between the beam and the pier, and utilizing the vibration of beam body with large mass, to absorb and store part of the seismic energy. Then the energy is dissipated through the damping between the beam body and the pier, so that the vibration phase of the beam body is opposite to the vibration phase of the pier in the natural frequency band of the pier, and the bending moment and stress borne by the pier are increased, thereby reducing the damage to the pier caused by the earthquake.

The elastic connector 40 may be conveniently arranged according to the specific conditions and needs, so that the vibration in the transverse direction of bridge or along the bridge direction, the vibration in the transverse direction of bridge and along the bridge direction and the vibration in the whole horizontal plane can be eliminated.

Referring to FIG. 5, the horizontal plane projections of the upper baffle 211, the lower baffle 221, and the elastic connector 40 are annular for eliminating the entire vibration in the horizontal plane.

Figure 8:
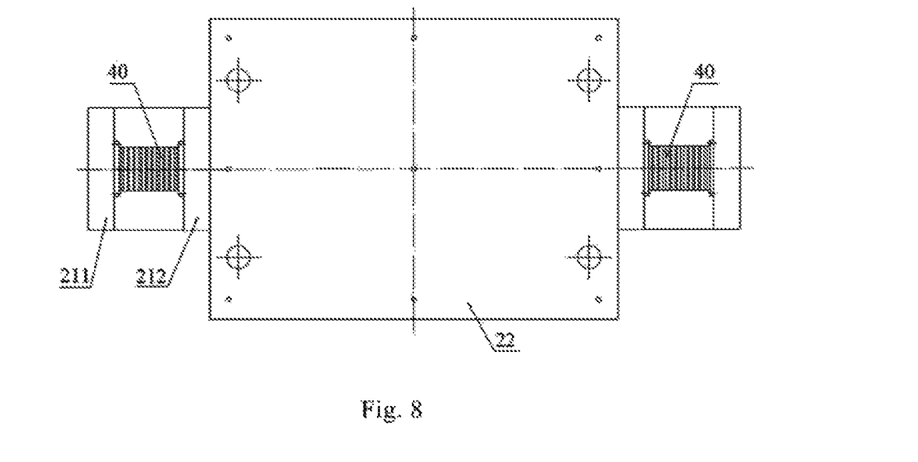
FIG. 8 is the upward view of example 2 of the energy dissipation and seismic mitigation bridge bearing of the invention.

Referring to FIG. 8, the upper baffles 211 and lower baffles 221 are arranged on both sides of the upper bearing plates 21 and lower bearing plates 22 in the transverse direction of the bridge, and the elastic connectors 40 are arranged between the upper baffle 211 and lower baffle 221 on the same side in the transverse direction of the bridge to eliminate vibration in the transverse direction of the bridge.

Figure 9:
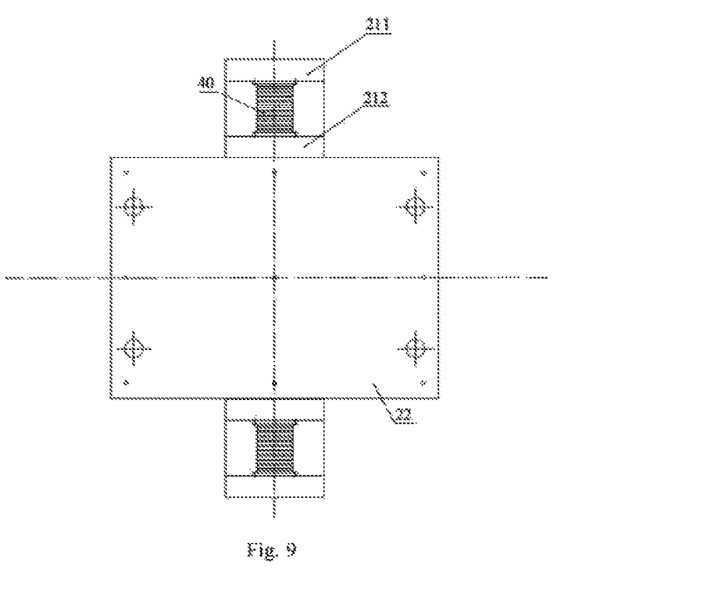
FIG. 9 is the upward view of example 3 of the energy dissipation and seismic mitigation bridge bearing of the invention.

Referring to FIG. 9, the upper baffles 211 and lower baffles 221 are arranged on both sides of the upper bearing plates 21 and lower bearing plates 22 along the bridge, and the elastic connectors 40 are arranged between the upper baffle 211 and lower baffle 221 on the same side along the bridge to eliminate vibration along the bridge.

Figure 10:
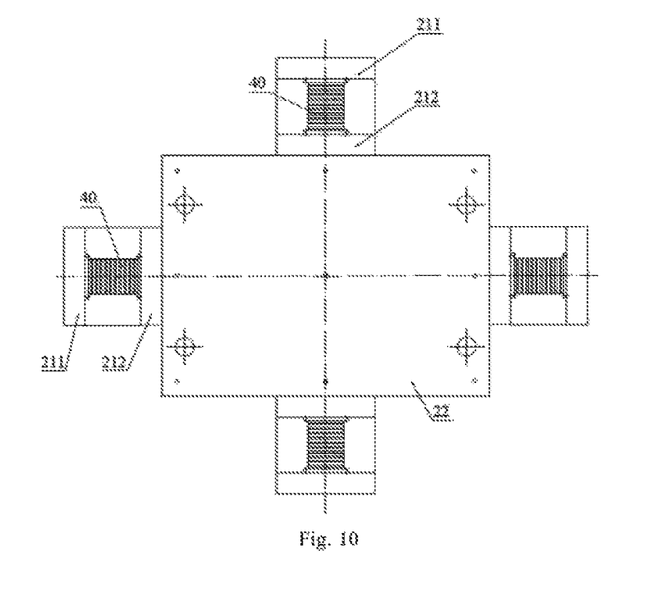
FIG. 10 is the upward view of example 4 of the energy dissipation and seismic mitigation bridge bearing of the invention.

Referring to FIG. 10, the upper baffles 211 and lower baffles 221 are arranged on four sides of the upper bearing plates 21 and lower bearing plates 22 in the transverse direction of the bridge and along the bridge, and the elastic connectors 40 are arranged between the upper baffle 211 and lower baffle 221 on the same side in the transverse direction of the bridge and along the bridge to eliminate vibration in the transverse direction of the bridge and along the bridge.

Above descriptions are only to explain the method for improving the seismic performance of bridges by utilizing the beam body and some principle of the energy dissipation and seismic mitigation bridge bearing of the invention with diagrams. The invention is not intended to be limited to the specific structure and scope of application shown and described, and therefore all corresponding modifications and equivalents that may be utilized fall within the scope of the patent applied of the invention.

What is claimed is:

1. A method for improving seismic performance of a bridge by using a beam body, wherein, the bridge comprises the beam body, a pier and a bearing system arranged between a top of the pier and longitudinal ends of the beam body; the method comprising the following steps:
   a. obtaining a natural frequency $f_i$, an equivalent modal mass $M_i$ and a modal stiffness $K_i$ of the pier in a longitudinal or transverse direction by a numerical modal analysis or experimental modal test;
   b. determining a mass mi of the beam body;
   c. calculating a connection stiffness $k_i$ between the beam body and the pier a first formula as following:

$$k_i = \frac{1}{\left(1+\frac{m_i}{M_i}\right)^2} \frac{K_i}{M_i} m_i;$$

d. calculating a connection damping $c_i$ between the beam body and the pier with a second formula as following:

$$c_i = 2m_i \sqrt{\frac{K_i}{M_i}} \sqrt{\frac{3\frac{m_i}{M_i}}{8\left(1+\frac{m_i}{M_i}\right)^3}}; \text{ and}$$

and e. selecting the bearing system with the connection stiffness $k_i$ and the connection damping $c_i$ to improve seismic performance of the pier with the beam body as a dynamic vibration absorber.

2. The method of claim 1, wherein, the modal stiffness $K_i$ in the step a is calculated as follows:

$$K_i = M_i (2\pi f_i)^2.$$

3. The method of claim 1, wherein, the bearing system is composed of a vertical bearing structure, a spring and a damping vibration absorber, wherein the vertical bearing structure is fixedly arranged on the top of the pier, and two ends of the spring and the damping vibration absorber are connected with the vertical bearing structure and the beam body respectively.

4. A bearing system with energy dissipation and seismic mitigation bridge bearing using the method of claim 1, comprising: an upper bearing plate, a lower bearing plate and a vertical bearing structure located between the upper bearing plate and the lower bearing plate; the upper bearing plate and lower bearing plate are respectively permanently connected with the beam body and a pier cushion; wherein outer edges of the upper bearing plate and the lower bearing plate are respectively provided with a first vertically extending structure of an upper baffle and a second vertically extending structure of a lower baffle, and elastic connectors are arranged on a horizontal plane between the upper baffle and lower baffle with a distal end and a proximal end of the elastic connectors fixedly connected with the upper baffle and lower baffle; and the connection stiffness ki and the connection damping ci between the beam body and the energy dissipation and seismic mitigation bridge bearing meet the requirements of the first formula and the second formula.

5. The bearing system of claim 4, wherein, each elastic connector is made of a rubber material or a high elastic damping material.

6. The bearing system of claim 4, wherein, horizontal plane projections of the upper baffle, the lower baffle, and the elastic connectors are annular.

7. The bearing system of claim 4, wherein, the upper baffle and lower baffle are arranged on both sides of the upper bearing plate and the lower bearing plate in a transverse direction of the bridge, and the elastic connectors are arranged between the upper baffle and lower baffle on a same side in the transverse direction of the bridge.

8. The bearing system of claim 4, wherein, the upper baffle and lower baffle are arranged on both sides of the upper bearing plate and the lower bearing plate along the bridge, and the elastic connectors are arranged between the upper baffle and lower baffle on a same side along the bridge.

9. The bearing system of claim 4, wherein, the upper baffle and lower baffle are arranged on four sides of the upper bearing plate and the lower bearing plate in a transverse direction of the bridge and along the bridge, and the elastic connectors are arranged between the upper baffle and lower baffle on a same side in the transverse direction of the bridge and along the bridge.

\* \* \* \* \*